United States Patent
Howie

(10) Patent No.: US 10,328,367 B2
(45) Date of Patent: Jun. 25, 2019

(54) WATER TREATMENT CARTRIDGE

(75) Inventor: Duncan Howie, Adelaide (AU)

(73) Assignee: Strix Limited, Ronaldsway (IM)

( * ) Notice: Subject to any disclaimer, the term of this patent is extended or adjusted under 35 U.S.C. 154(b) by 1032 days.

(21) Appl. No.: 14/115,578

(22) PCT Filed: May 4, 2012

(86) PCT No.: PCT/GB2012/050985
§ 371 (c)(1),
(2), (4) Date: Feb. 4, 2014

(87) PCT Pub. No.: WO2012/150465
PCT Pub. Date: Nov. 8, 2012

(65) Prior Publication Data
US 2014/0138302 A1    May 22, 2014

(30) Foreign Application Priority Data

May 4, 2011    (GB) .................................. 1107428.3

(51) Int. Cl.
| | |
|---|---|
| *C02F 1/00* | (2006.01) |
| *B01D 27/08* | (2006.01) |
| *B01D 35/30* | (2006.01) |
| *B01D 39/20* | (2006.01) |
| *B01D 46/24* | (2006.01) |

(52) U.S. Cl.
CPC ............. *B01D 35/30* (2013.01); *B01D 27/08* (2013.01); *C02F 1/00* (2013.01); *C02F 1/003* (2013.01); *B01D 39/2055* (2013.01); *B01D 46/2411* (2013.01); *B01D 46/2414* (2013.01); *B01D 2201/291* (2013.01); *B01D 2201/296* (2013.01);
(Continued)

(58) Field of Classification Search
CPC .... B01D 35/30; B01D 27/08; B01D 46/2414; B01D 46/2411; B01D 39/2055; B01D 2201/291; B01D 2201/296; C02F 1/00; C02F 1/003; C02F 2307/04; C02F 2201/006; C02F 2301/04
See application file for complete search history.

(56) References Cited

U.S. PATENT DOCUMENTS 2,143,044 A * 1/1939 Wicks .................... B01D 27/02
                                                                210/435
3,685,659 A * 8/1972 Heskett .................. B01D 35/30
                                                                210/444
(Continued)

FOREIGN PATENT DOCUMENTS

| CN | 101439886 | 5/2009 |
|---|---|---|
| CN | 201806531 | 4/2011 |

(Continued)

*Primary Examiner* — Heidi R Kelley
*Assistant Examiner* — Angel Olivera
(74) *Attorney, Agent, or Firm* — O'Shea Getz P.C.

(57) ABSTRACT

A water treatment cartridge includes a base having a recess therein. One outlet is located in the recess in the base and at least one further outlet is located away from the recess in the base. The outlet located in the recess in the base may be surrounded by an annular wall which projects away from the base of the water treatment cartridge to cooperate with a hopper in which the cartridge is fitted. The outlets can be designed to restrict the flow of water through the cartridge independently of any hopper in which the cartridge is mounted.

19 Claims, 4 Drawing Sheets

(52) U.S. Cl.
CPC .... *C02F 2201/006* (2013.01); *C02F 2307/04* (2013.01)

(56) References Cited

U.S. PATENT DOCUMENTS

| | | | |
|---|---|---|---|
| 4,741,828 A | 5/1988 | Alhaeuser et al. | |
| 5,322,625 A * | 6/1994 | Rise ........................ | B01D 24/04 210/238 |
| 5,888,381 A * | 3/1999 | Primdahl ............... | B01D 61/18 200/81.9 M |
| 8,454,826 B2 | 6/2013 | Donnelly et al. | |
| 2007/0246421 A1 | 10/2007 | Walde et al. | |
| 2010/0307986 A1* | 12/2010 | Alexandrou ............ | C02F 1/003 210/739 |
| 2011/0005991 A1 | 1/2011 | Merz et al. | |

FOREIGN PATENT DOCUMENTS

| | | | | |
|---|---|---|---|---|
| DE | 102007033339 | | 1/2009 | |
| DE | 102007033339 A1 * | 1/2009 | ............. | C02F 1/003 |
| EP | 2263503 | | 12/2010 | |
| JP | 2009125662 | | 6/2009 | |
| JP | 2011078900 | | 4/2011 | |
| WO | 2004014801 | | 2/2004 | |
| WO | 200511848 | | 12/2005 | |
| WO | 2010034735 | | 4/2010 | |

* cited by examiner

WATER TREATMENT CARTRIDGE

This application is entitled to the benefit of, and incorporates by reference essential subject matter disclosed in PCT Application No. PCT/GB2012/050985 filed on May 4, 2012, which claims priority to GB11074.28 filed May 4, 2011.

BACKGROUND OF THE INVENTION

1. Technical Field

The present invention relates to water treatment apparatus, more particularly to domestic water treatment cartridges.

2. Background Information

Such products are widely known and are used to improve the taste and odor of domestic drinking water. The cartridge contains a granular treatment medium such as an ionic exchange medium, a ceramic filtration medium, activated carbon or charcoal, minerals and mixtures of these. The treatment medium is retained within the cartridge by grilles or meshes provided at the upper and lower ends of the cartridge.

Often the cartridge sits within a hopper into which tap water is introduced, the tap water then percolating through the cartridge into a collection vessel below. The collection vessel may simply be a jug or bottle from which the treated water is dispensed, or it may be a water cooling appliance, steam producing appliance, or water heating vessel such as a kettle or the like.

The present invention seeks to provide a water treatment cartridge which can be used in any of the above contexts.

A common example of such a hopper has an outlet at the top of an inwardly protruding bore which is part of a design intended to restrict the outflow of water into the collection vessel, after the water has percolated through the cartridge. Typically water that has percolated through the cartridge passes out through one or more outlets in the base of the cartridge that are located radially outward of a central recess which is designed to accommodate the protruding bore. More recently the design of this hopper has been altered to reduce the flow further by incorporating a valve in the protruding outlet bore. As is seen e.g. in WO 2009/115482, the cartridge may be provided with a protruding element in the recess to open the valve when it is inserted in a hopper. This further reduction in flow causes the water to take a long time to reach the collection vessel after the hopper has been filled with untreated water. Furthermore, the actual restriction in flow can vary depending on how far the cartridge is pushed into the hopper, e.g. there is a greater restriction if the cartridge is inserted further as this reduces the cross-sectional area between the hopper and the cartridge but if the cartridge is not fully inserted the valve will not be opened.

Other water treatment cartridges are designed to restrict the outflow of water internally rather than relying on the void formed between the base of the cartridge and a hopper. For example, EP 2263503 discloses a cartridge with the filter material arranged in an inner chamber that exhausts water into a void in an outer chamber providing a restricted flow path to a single central outlet. DE 102007033339 discloses a cartridge with the filter material arranged in an inner chamber that is fixed inside an outer chamber. Water percolates out through the bottom of the inner chamber and into a void between the two chambers before exiting the cartridge through a single central outlet. However, if such cartridges are mounted in a hopper having an inwardly protruding bore at the location of the single central outlet then there is a risk that the outflow of water will experience a further flow restriction. Such a double flow restriction can excessively extend the time it takes for water to reach a collection vessel below the hopper.

SUMMARY OF THE DISCLOSURE

From a first aspect the present invention provides a water treatment cartridge comprising a base having a recess therein, comprising one outlet located in the recess in the base, and at least one further outlet located away from the recess in the base.

Thus it will be appreciated that by providing an outlet in the recess in the base, as well as outlet(s) located outside the base, the water passing through this outlet can effectively bypass the restriction provided by the hopper in which the water treatment cartridge is installed (for hoppers which have an outlet below this point), e.g. by the void between the cartridge and the hopper, and pass straight into the water collection vessel. Therefore the outflow from the cartridge is not restricted as much as if outlets were only provided in the base of the cartridge outside the recess and so a more acceptable flow rate into the collection vessel is experienced by the user.

As compared to cartridges that only have a single outlet in a recess in the base, the outlet(s) located in and away from the recess may be used to provide a desired outflow restriction without requiring internal flow restriction features. Thus, for example, the cartridge may not have an inner chamber spaced from an outer chamber with a void therebetween to provide a restricted flow path. Preferably the cartridge comprises a single chamber with multiple outlets to allow water to exit.

It will also be seen that with such a design the water outflow rate is more independent of the flow restriction imposed by the hopper and simply depends on the design of cartridge, i.e. the cartridge can be arranged to give the flow rate necessary to give adequate filtering of the water. In particular, the outlets can be designed to restrict the flow of water through the cartridge independently of any hopper in which it is mounted. In a preferred set of embodiments the outlet in the recess and/or the outlet(s) away from the recess comprise a restricted outlet. The size of each restricted outlet may be such as to control the flow of water through the cartridge (e.g. through a treatment medium contained in the cartridge). The restricted outlet(s) may be designed so as to obtain a consistent flow time through the cartridge.

It will be understood that a cartridge "outlet" as defined herein means an outlet that allows water to exit the cartridge. In other words, water flows through an outlet of the cartridge to the exterior.

It may be thought to be counter-intuitive to place an outlet in the recess in the base, because of the raised level of the outlet, and therefore the assumption that the majority of the water will pass straight through this outlet and not through the further outlet(s), thereby bypassing a significant proportion of the filter material and leading to inadequate treatment of the water. However, the Applicant has found that this is not the case, and that with approximately equally sized outlets, the flow rate is divided equally between the outlets, regardless of their position, and so efficient treatment of the water is maintained. Therefore preferably the outlets are arranged to give an equal flow rate therethrough.

The further outlet(s) could be located in any suitable position on the water treatment cartridge, e.g. the side wall, the base. There could be any number of further outlets located away from the recess in the base, but in a preferred set of embodiments the water treatment cartridge comprises two outlets located away from the recess in the base. Preferably the two further outlets are located in the base, e.g. radially outward of the recess. The two further outlets may be arranged symmetrically relative to the recess.

In one set of embodiments the water treatment cartridge is provided with a sealing surface, e.g. a sealing rim, arranged in use to provide sealing engagement with the hopper that the cartridge is inserted into. This ensures that all the water poured into the hopper passes through the cartridge and prevents any water bypassing the cartridge, i.e. all the water gets filtered. In this set of embodiments, the at least one further outlet is provided below the sealing surface.

The outlets could comprise holes, e.g. circular holes, through the wall of the water treatment cartridge, or the outlets could comprise a grille or mesh in the wall of the cartridge, e.g. over a larger area than a corresponding hole. In the embodiments in which circular holes are provided, the diameter of these preferably helps to control the outlet flow rate of water from the cartridge. In one set of embodiments the circular outlet holes are between 1.8 mm and 2.6 mm in diameter, preferably between 2.0 mm and 2.4 mm in diameter. As mentioned above, the size of the outlets may be chosen such as to control the flow of water through the cartridge so as to obtain a consistent flow time through the cartridge.

In a preferred set of embodiments the outlet located in the recess in the base comprises a circular hole of diameter 2.3 mm, and/or the at least further outlet, located away from the recess in the base, comprises a circular hole of diameter 2.1 mm.

For any of the types of outlets discussed above, but particularly when an outlet hole is provided, preferably a grille or mesh extends across the outlets and is arranged to retain particles away from the outlets. The grille or mesh could extend across the base of the cartridge or across each individual outlet. Preferably the grille or mesh is spaced internally from the corresponding outlet(s). The grille or mesh acts to retain the filter material in the body of the water treatment cartridge and prevents it clogging the outlet hole. Preferably the grille or mesh does not restrict the flow of water through the outlets (or not beyond any restriction imposed by the outlets themselves).

In one set of embodiments the outlet located in the recess in the base is surrounded by an annular wall which projects away from the base of the water treatment cartridge, e.g. a spigot. The annular wall is provided, for example, to cooperate with the valve which may be provided in the hopper and need to be opened by the cartridge to allow water to flow out of the hopper. The annular wall can also help to direct water from the outlet within it through the outlet in the protruding bore of the hopper, i.e. where it is bypassing the hopper by flowing straight out of the cartridge into the collection vessel. This bypassing of the hopper can increase the flow of water through the water treatment cartridge as the water that passes out of this outlet is not restricted by the hopper, e.g. by the void between the cartridge and the hopper.

The invention also extends to a water treatment appliance comprising a chamber for receiving untreated water, said chamber comprising an outflow opening and having a water treatment cartridge according to the first aspect of the invention mounted within the chamber, wherein the outflow opening is in fluid communication with the at least one other outlet of the water treatment cartridge located away from the recess in the base. In a preferred set of embodiments the outlet in the recess in the base of the water treatment cartridge is aligned with the outflow opening in the chamber.

The water treatment cartridge could be any shape, i.e. to fit a particular design of hopper, but in one set of embodiments the cartridge is cylindrical with an oval shaped base, i.e. one axis is longer than the other. In this set of embodiments the side walls are generally straight and substantially vertical.

The water treatment cartridge will generally comprise inlets, e.g. one or more inlets, in its upper surface, i.e. the opposite side of the cartridge to the base. As with the outlets, the inlets can include a grille or mesh to prevent foreign bodies passing into and clogging the cartridge, as well as retaining the filter material within the cartridge if it is upturned, e.g. in transit. In one set of embodiments the inlets and outlets are arranged so that the flow rate of untreated water into the water treatment cartridge through the inlets is greater than the flow of treated water through the outlets. This arrangement causes the water to back up in the cartridge and controls the duration of the water in the cartridge, i.e. the flow rate of water through the cartridge is determined by the number and size of the outlets. Therefore adequate treatment of the water by the filter material in the cartridge is ensured, and compaction of the filter material in the bottom of the cartridge is avoided.

In one set of embodiments the water treatment cartridge comprises an attachment, preferably located on an upper portion of the cartridge, which is arranged to cooperate with a hopper to allow the cartridge to be secured so as to depend downwardly from an outlet opening of the hopper. The attachment may comprise a mounting part. The mounting part may be a separate attachment, but preferably it is integrally provided by the cartridge. The attachment could comprise any suitable attachment means, e.g. a screw fitting or a latch fitting, but preferably the attachment comprises a bayonet fitting. This enables the cartridge to be fitted into hoppers of the type having an outflow opening in the base, e.g. as described in the Applicant's International Applications WO 2004/014801 and WO 2004/014519.

Preferably the cartridge contains a water treatment medium. The water treatment medium may comprise any suitable medium for removing unwanted components from and/or adding desired components to the water being treated. The water treatment medium preferably comprises water treatment granules comprising ion exchange particles, activated carbon or charcoal particles, minerals, ceramic filtration media, e.g. in the form of discs, other treatment materials or mixtures thereof.

The water treatment appliance can be a jug or bottle, a liquid heating vessel, e.g. a kettle, a coffee maker or other type of heated water dispenser, a steam producing appliance, or a water cooling appliance.

BRIEF DESCRIPTION OF THE DRAWINGS

Certain preferred embodiments of the invention will now be described, by way of example only, with reference to the accompanying drawings in which.

DETAILED DESCRIPTION OF THE INVENTION

Figure 1:
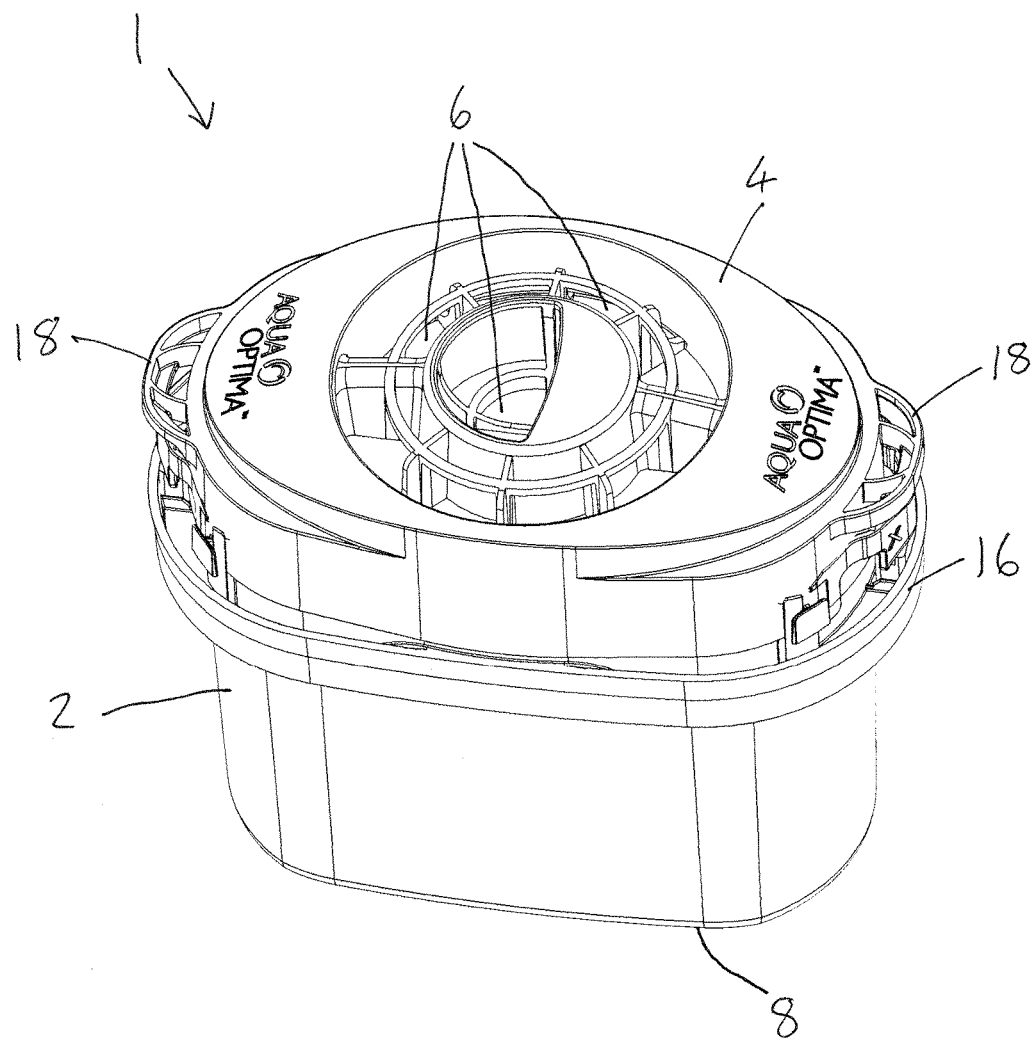
FIGS. 1 and 2 show isometric views of a water treatment cartridge in accordance with an embodiment of the invention.
Figure 2:
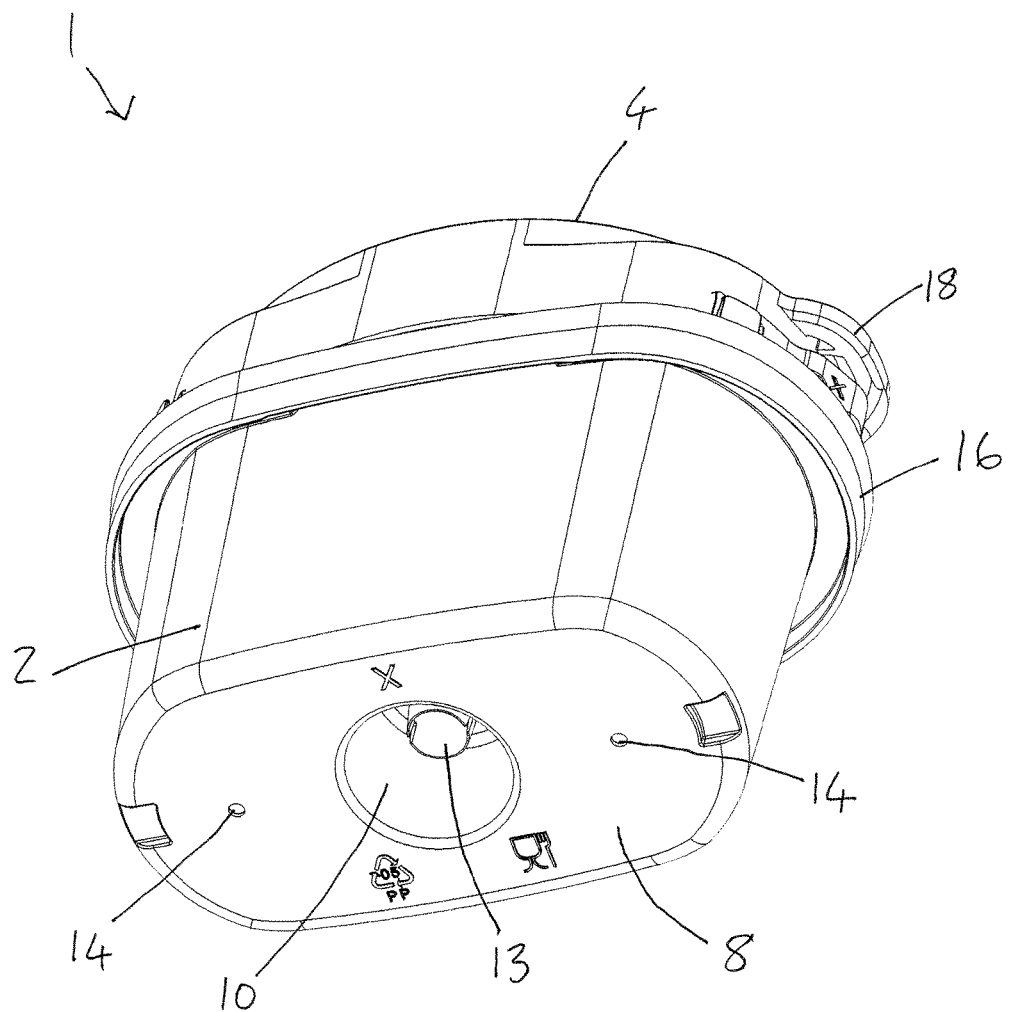

FIGS. 1 and 2 show isometric views of a water treatment cartridge 1 in accordance with an embodiment of the invention. The cartridge 1 comprises a body 2 which is filled with filter material, e.g. activated carbon and an ionic exchange medium. The upper surface 4 of the body 2 has inlets 6 in it to allow water to flow into the cartridge 1, the inlets 6 comprising a grille and mesh which prevents foreign bodies passing into the cartridge 1 and retains the filter material within the body 2 of the cartridge 1. The base 8 of the cartridge 1 includes a recess 10 which contains a projecting annular spigot 13 which surrounds an outlet hole 12 (hidden within the spigot). Two further outlet holes 14 are provided in the base 8 of the cartridge 1. The outlet holes 12, 14 allow treated water to flow out of the cartridge 1, i.e. each outlet 12, 14 exhausts water to the exterior of the cartridge.

Figure 3:
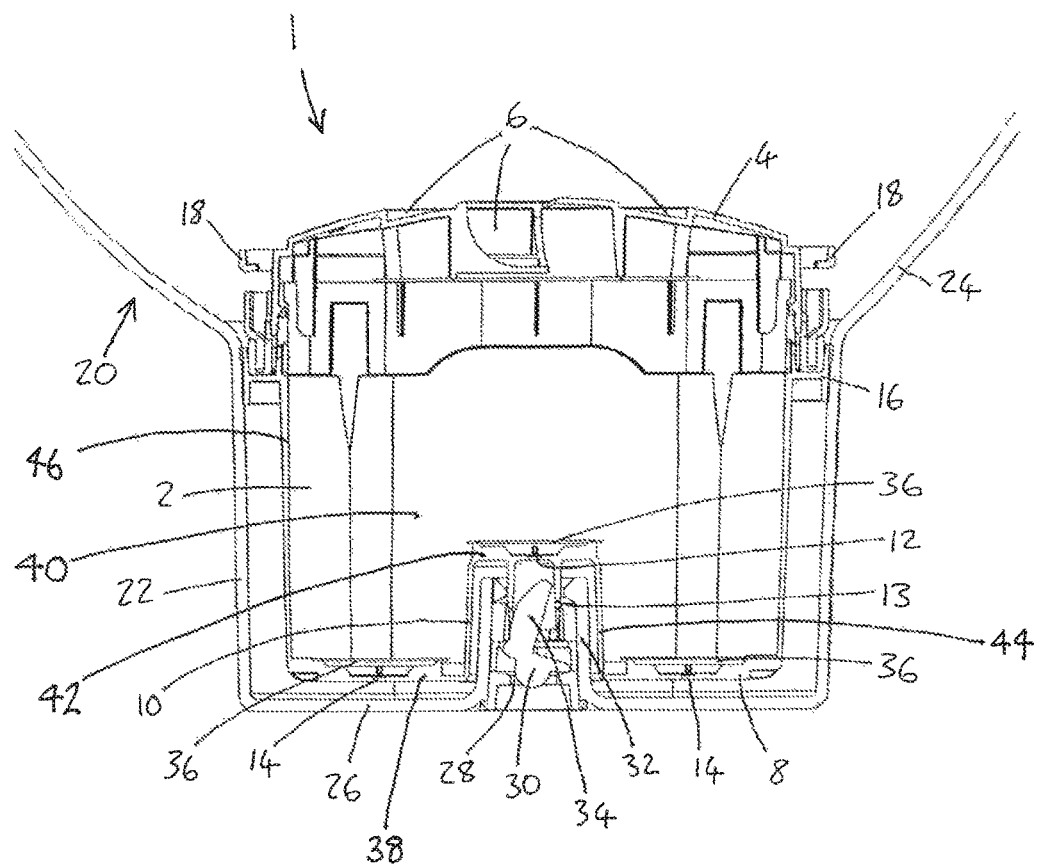
FIG. 3 shows a cross-section of the cartridge installed in a typical hopper.

The body 2 of the cartridge 1 further comprises a sealing rim 16 mounted between the upper surface 4 and the base 8 to provide a water tight seal when the cartridge 1 is installed into a hopper of a water treatment appliance (see FIG. 3 for more details). Bayonet mounting lugs 18 are also provided on the body 2 of the cartridge 1, just below the upper surface 4, so that the cartridge 1 can be installed into a hopper which has this type of attachment mechanism.

FIG. 3 shows a cross-sectional view of the water treatment cartridge 1 shown in FIGS. 1 and 2, when installed in a typical hopper 20 of a water treatment appliance, e.g. a water filter jug.

The hopper 20 comprises a lower portion 22 with slightly tapering walls into which the cartridge 1 is inserted, and an upper concave portion 24 into which water is poured, so that it can be filtered by passing through the cartridge 1 and the filter material that it contains. The base 26 of the lower portion 22 of the hopper 20 comprises an outlet 28. The outlet 28 comprises a valve 30 within an inwardly projecting protrusion 32.

The valve 30 includes a tiltable valve member 34 which has to be opened to allow water to flow out of the hopper 20 through the outlet 28. The recess 10 and the annular spigot 13 on the base 8 of the cartridge 1 are shaped to accommodate the inward protrusion 32 of the hopper outlet 28.

In the cross-sectional view shown in FIG. 3, it can be seen that the outlet holes 12, 14 of the cartridge 1 are covered with disc-shaped meshes 36 which act to retain the filter material within the body 2 of the cartridge 1 to prevent it blocking the outlet holes 12, 14.

As can also be seen in FIG. 3, the outlet hole 12 (i.e., the first outlet) and the outlet holes 14 (i.e., the at least one second outlet) are provided below the sealing rim 16. The recess 10 is disposed in the base 8 and extends from a lower base wall 38 and into the water treatment chamber 40 to define an upper base wall 42 in the external wall at the bottom of the cartridge 1 at a level above the lower base wall 38. Further, the recess 10 has the outlet hole 12, i.e. the first outlet, located in the upper base wall 42 and below the sealing rim 16. As is apparent from FIG. 3, the recess 10 comprises an upper part, i.e. the upper base wall 42, and a further wall 44 extending from the lower base wall 38 into the body 2 to the upper part, the further wall 44 being independent of and spaced from the side walls 46 of the body 2 such that the side walls 46 surround the recess 10.

Figure 4:
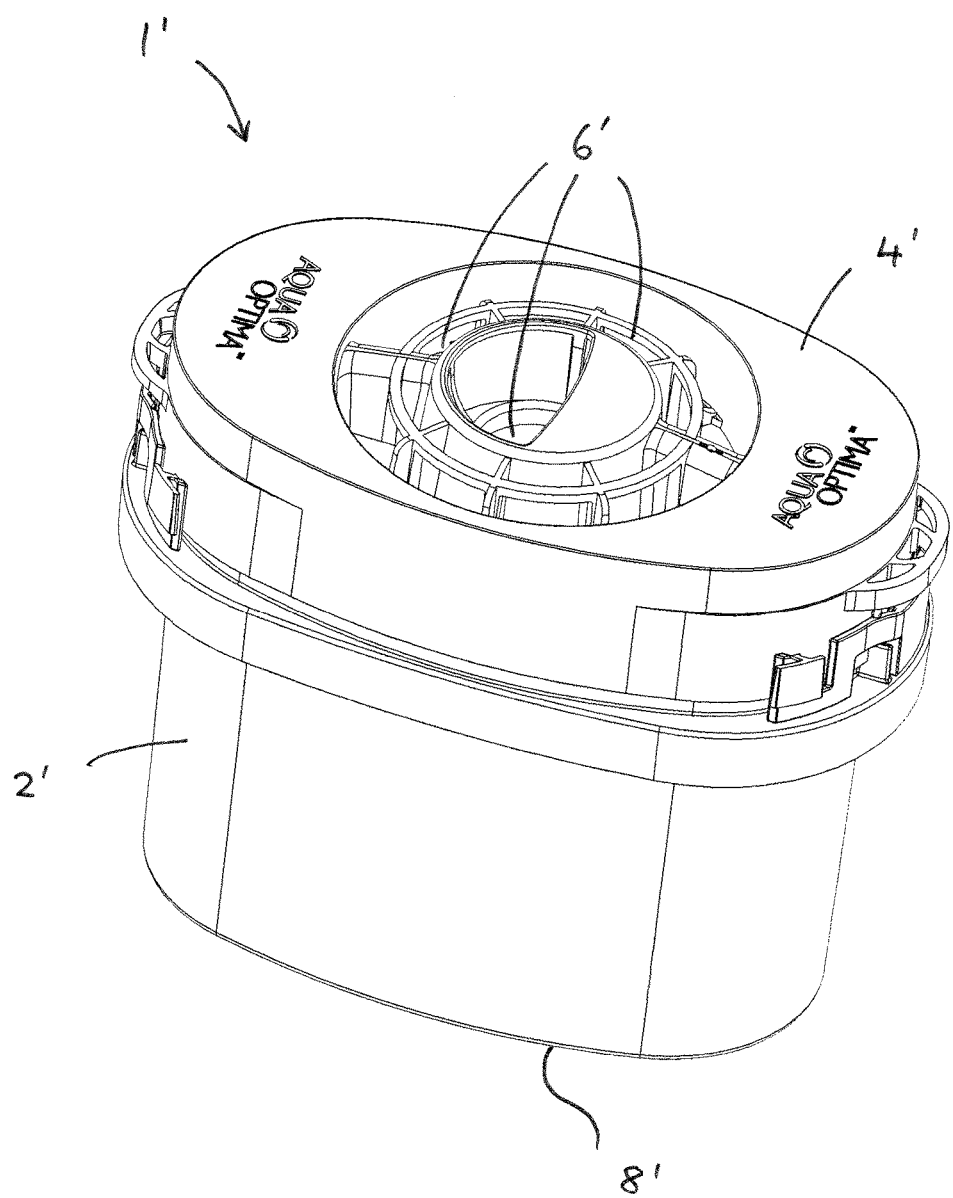
FIG. 4 shows an isometric view of a water treatment cartridge in accordance with another embodiment of the invention.

In the further embodiment seen in FIG. 4 the cartridge 1' is essentially the same as described with respect to FIGS. 1-3, except the upper surface 4' of the body 2' is substantially flat rather than being crowned (as seen in FIG. 1). The inlets 6' are still spaced the same distance from the base 8' of the cartridge 1' due to the thickness of the cap providing the upper surface 4'.

In operation the water treatment cartridge 1 is inserted into the lower portion 22 of the hopper 20, into the position shown in FIG. 3. The sealing rim 16 of the cartridge 1 engages with the inner wall of the lower portion 22 of the hopper 20 to create a water tight seal between the hopper 20 and the cartridge 1, thereby ensuring that all the water poured into the upper portion 24 of the hopper 20 passes through the cartridge 1. The dimensions of the sealing rim are designed to control the depth to which the cartridge 1 can be inserted into the lower portion 22 since the latter has tapering walls.

Also when the cartridge 1 is inserted into hopper 20, the spigot 13 contacts the sloping shoulder at the top of the valve member 34 to tilt it away from its resting position, thereby allowing water to flow out of the hopper 20. Apart from the sealing rim 16, this is the only point of contact between the cartridge 10 and the hopper 20.

Once the cartridge 1 has been installed into the hopper 20, untreated water can be poured into the upper portion 24 of the hopper 20. From here it flows into the cartridge through the inlets 6 in the upper surface 4 of the cartridge 1, and percolates through the filter material. The treated water then flows out of the outlets 12, 14 of the cartridge.

Water flowing out of the central outlet hole 12 within the spigot 13 in the recess 10 in the cartridge 1 bypasses the lower portion 22 of the hopper 20, i.e. the hole at the top of the inwardly projecting protrusion 32, and therefore only has to flow through the outlet 28 by the valve 30 in the bottom of the hopper 20 to then be collected in the water treatment appliance for further use.

Water flowing out of the other outlet holes 14 in the base 8 of the cartridge 1 is first collected in the lower portion 22 of the hopper 20 from where it then flows along the annular gap between the inwardly projecting protrusion 32 of the hopper 20 and the recess 10 in the base 8 of the cartridge 1 to allow it to pass first through the hole in the top of the inwardly projecting protrusion 32 and then through the outlet 28 by the valve 30 in the bottom of the hopper 20 to again be collected in the water treatment appliance for further use.

The cartridge 1' seen in FIG. 4 may be mounted in the hopper 20 in the same way as described above.

It will be appreciated by those skilled in the art that many variations and modifications to the embodiments described above may be made within the scope of the various aspects of the invention set out herein. For example any number of additional outlets in the body of the cartridge below the sealing rim could be provided, e.g. in the side walls.

What is claimed is:

1. A water treatment cartridge, comprising:
a first outlet and at least one second outlet each arranged to exhaust water to the exterior of the cartridge;
a body comprising a sealing rim arranged in use to provide a sealing arrangement with a hopper that the water treatment cartridge is inserted into, and wherein the first outlet and the at least one second outlet are provided below the sealing rim, the body having side walls and a base together defining a water treatment chamber therein, the base forming an external wall at a bottom of the cartridge, the external wall comprising a lower base wall and a recess disposed in the base extending from the lower base wall and into the water treatment chamber to define an upper base wall in the external wall at the bottom of the cartridge at a level above the lower base wall, the recess having the first outlet located in the upper base wall and below the sealing rim, and the base further including the at least one second outlet located in the lower base wall and away from the recess; and a water treatment medium disposed within the body in the water treatment chamber, the water treatment medium including one or more of ion exchange particles, an ionic exchange medium, activated carbon, or charcoal particles.

2. The water treatment cartridge as claimed in claim 1, wherein the first outlet located in the upper base wall is surrounded by an annular wall which projects away from the upper base wall of the water treatment cartridge.

3. The water treatment cartridge as claimed in claim 1, comprising two second outlets located in the lower base wall and away from the recess in the base.

4. The water treatment cartridge as claimed in claim 1, wherein the first outlet in the recess and/or the second outlet(s) away from the recess comprise a restricted outlet having a size such as to control the flow of water through the cartridge.

5. The water treatment cartridge as claimed in claim 1, wherein the first and second outlets comprise circular holes.

6. The water treatment cartridge as claimed in claim 5, wherein the first and second circular outlet holes are between 1.8 mm and 2.6 mm in diameter.

7. The water treatment cartridge as claimed in claim 1, comprising a grille or mesh extending across the outlets arranged to retain particles away from the first and second outlets.

8. The water treatment cartridge as claimed in claim 7, wherein the grille or mesh is spaced internally from the corresponding first or second outlet(s).

9. The water treatment cartridge as claimed in claim 1, wherein the cartridge is cylindrical with an oval shaped base.

10. The water treatment cartridge as claimed in claim 1, comprising one or more inlets in an upper surface of the cartridge, wherein the inlets and the first and second outlets are arranged so that the flow rate of untreated water into the water treatment cartridge through the inlets is greater than the flow of treated water through the first and second outlets.

11. The water treatment cartridge as claimed in claim 1, wherein the water treatment cartridge comprises an attachment arranged to cooperate with a hopper to allow the cartridge to be secured so as to depend downwardly from an outlet opening of the hopper.

12. The water treatment cartridge as claimed in claim 11, wherein the attachment is located on an upper portion of the cartridge.

13. The water treatment cartridge as claimed in claim 11, wherein the attachment comprises a bayonet fitting.

14. A water treatment cartridge, comprising:

a body having side walls and a base together defining a water treatment chamber therein, wherein the base comprises a lower base wall and a recess, the recess comprising an upper part and a further wall extending from the lower base wall into the body to the upper part, the further wall being independent of and spaced from the side walls of the body such that the side walls surround the recess;

an outlet located in the upper part of the recess; and at least one further outlet located away from the recess.

15. The water treatment cartridge as claimed in claim 14, wherein the outlet located in the upper part of the recess is surrounded by an annular wall which projects away from the upper part of the recess.

16. The water treatment cartridge as claimed in claim 14, comprising two further outlets located in the lower base wall and away from the recess.

17. The water treatment cartridge as claimed in claim 14, wherein the outlet in the recess and/or the at least one further outlet(s) away from the recess comprise a restricted outlet having a size such as to control the flow of water through the cartridge.

18. The water treatment cartridge as claimed in claim 14, wherein the outlet and at least one further outlet comprise circular holes.

19. The water treatment cartridge as claimed in claim 14, wherein the body comprises a sealing rim around the side walls at a level above the upper part of the recess.

* * * * *